(12) United States Patent
Brooks

(10) Patent No.: US 10,104,878 B2
(45) Date of Patent: Oct. 23, 2018

(54) ROTARY AUGER FISHING POLE HOLDER

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

(*) Notice: Subject to any disclaimer, the term of this patent is extended or adjusted under 35 U.S.C. 154(b) by 0 days.

(21) Appl. No.: 15/453,585

(22) Filed: Mar. 8, 2017

(65) Prior Publication Data

US 2017/0251654 A1    Sep. 7, 2017

Related U.S. Application Data

(63) Continuation-in-part of application No. 14/999,090, filed on Mar. 29, 2016, which is a continuation-in-part of application No. 14/998,681, filed on Feb. 5, 2016, now Pat. No. 9,739,025, which is a continuation-in-part of application No. 14/121,468, filed on Sep. 9, 2014, now Pat. No. 9,347,733.

(60) Provisional application No. 62/389,737, filed on Mar. 8, 2016.

(51) Int. Cl.
*A45F 3/44* (2006.01)
*A01K 97/10* (2006.01)
*E02D 5/80* (2006.01)
*A01M 31/00* (2006.01)
*F41B 5/14* (2006.01)

(52) U.S. Cl.
CPC ............ *A01K 97/10* (2013.01); *A01M 31/00* (2013.01); *E02D 5/801* (2013.01); *F41B 5/1453* (2013.01)

(58) Field of Classification Search
CPC ..... F41B 5/1453; A01M 31/00; F16M 13/022
See application file for complete search history.

(56) References Cited

U.S. PATENT DOCUMENTS

| 32,226 A | 4/1861 | Dotson |
| 168,890 A | 10/1875 | Field |
| 345,877 A | 7/1886 | Brainard |
| 907,799 A | 12/1908 | Hawley |
| 1,562,343 A | 11/1925 | Post |
| 2,269,996 A | 1/1942 | Milton et al. |
| 2,447,444 A | 8/1948 | Waite |
| 2,563,159 A | 8/1951 | Louis |
| 2,901,789 A | 9/1959 | Frank |
| 3,059,732 A | 10/1962 | Hammack |
| 3,286,962 A | 11/1966 | Warth |

(Continued)

*Primary Examiner* — Amy J. Sterling
(74) *Attorney, Agent, or Firm* — Carrithers Law Office, PLLC

(57) ABSTRACT

A rotary auger fishing pole holder for removably holding a handle of a fishing pole or fishing rod in an upright position on the ground. The stand includes an upright rod with a helical coil or flights forming an auger base having a point at the lower distal end to be fixedly and removably screwed into the ground to support the stand in an upright position. The top end of the rod forming the stand body includes a ring or loop for insertion of a proximate end of a fishing rod there thorough and a cup spaced apart from and in alignment with the ring to support a distal end of the pole or rod handle therein. The cup is disposed above a portion of the elongated rod forming an integral S-shaped loop defining a handle for rotating the auger into the ground.

17 Claims, 4 Drawing Sheets

(56) References Cited

U.S. PATENT DOCUMENTS

| | | | |
|---|---|---|---|
| 3,318,560 A | | 5/1967 | Garrette, Jr. et al. |
| 3,688,454 A | * | 9/1972 | Wolfcarius ............. G01C 15/04 |
| | | | 52/103 |
| 4,928,418 A | | 5/1990 | Stelly |
| 5,098,057 A | | 3/1992 | Gran |
| 6,116,760 A | | 9/2000 | Cox |
| 6,412,236 B1 | | 7/2002 | Johnson |
| 6,481,147 B2 | | 11/2002 | Lindaman |
| 6,487,977 B1 | | 12/2002 | Willaims |
| 6,698,132 B1 | | 3/2004 | Brint |
| 6,810,630 B2 | | 11/2004 | Chizmas |
| 6,901,693 B1 | | 6/2005 | Crowe |
| D550,071 S | | 9/2007 | Powell |
| D554,980 S | | 11/2007 | Mihelis |
| 7,493,873 B2 | * | 2/2009 | Petersen .................. A01K 1/04 |
| | | | 119/789 |
| 8,230,638 B1 | * | 7/2012 | Dunaway .............. A01M 31/06 |
| | | | 43/2 |
| 2005/0268522 A1 | | 12/2005 | Foster |
| 2014/0332645 A1 | | 11/2014 | Brooks |

\* cited by examiner

ROTARY AUGER FISHING POLE HOLDER

CROSS REFERENCE TO RELATED APPLICATIONS

This application claims priority from U.S. Provisional Application Ser. No. 62/389,737 filed on Mar. 8, 2016 and is Continuation-In-Part of Ser. No. 14/999,090 filed on Mar. 29, 2016 which is a Continuation-In-Part of U.S. application Ser. No. 14/999,498 filed on Feb. 25, 2016 and U.S. application Ser. No. 14/998,681 filed on Feb. 5, 2016 which claims priority and is a Continuation-In-Part of U.S. Pat. No. 9,347,733 which issued on May 24, 2016 from Ser. No. 14/121,468 filed on Feb. 25, 2016 all of which are incorporated herein in their entirety.

TECHNICAL FIELD

The present invention relates to a rotary auger fishing pole holder for holding a handle of a fishing pole and the rod in a vertical or selected angle position with respect to the ground.

BACKGROUND OF THE INVENTION

Shore fisherman often tire of holding a fishing pole or the handle of a rod and reel assembly so they typically place the pole on the ground or prop it up on a rock, log, limb or other structure while watching the float waiting for a fish to bite. Other times a fisherman may fish with several fishing poles simultaneously to increase the odds of catching a fish.

It is necessary that the pole support holds the pole above the ground and/or water and be firmly connected to the ground. Some support stakes have only one spiked end. Other pole stakes have two spikes which are shoved into the ground: a stout primary spike and a lighter secondary parallel spike, the two spikes being simultaneously shoved into the ground. The stout spike gives the stake strength and rigidity and the lighter spike prevents the stake from spinning in the ground.

SUMMARY OF THE INVENTION

The portable and reusable auger tie down holder of the present invention includes an integrated loop handle which can be installed in the ground with no tools by twisting and rotating the handle screwing the auger base into the ground including sandy or muddy surfaces providing a support to hold the fishing pole above the ground at a vertical or selected upright position for quick and easy accessibility.

The present invention provides for a rotary auger fishing pole holder for removably holding a fishing pole in an upright or angle position with respect to the ground. The stand includes an upright rod with a helical coil or flights forming an auger base having a point at the lower distal end to be fixedly and removably screwed into the ground to support the stand in an upright position. The top end of the rod forming the stand body includes a ring or loop for insertion of a proximate end of a fishing rod there thorough which may be formed integrally from the rod or attached thereto. A holding means for supporting and holding the distal end of the rod handle such as a cup or plate extends from and is spaced apart from and in alignment with one or more rings to support a distal end of the pole or rod handle therein. The cup is disposed above a portion of the elongated rod forming an integral S-shaped loop defining a handle for rotating the auger into the ground.

The stand includes an upright rod with a helical coil or flights forming an auger base having a point at the lower distal end to be fixedly and removably screwed into the ground to support the stand in an upright position. The top end of the rod forming the stand body defines an S-shaped loop configured, sized and shaped and disposed at a selected angle to support a the arm of a tie down holding the tie down in a substantially vertical position above the ground. The integral loop which supports the tie down forms a handle for the purpose of rotating the auger into the ground. The auger includes a vertical shaft having a cork screw or a helical coil formed in the bottom end, a top end capable of supporting a decorative element, sign, target, or other element, and having an S-shaped handle formed integrally within the support shaft or longitudinal member extending from the auger with an vertically disposed "S" shaped loop formed in the center of the stand for enabling the screwing of the cork screw into the ground for vertical stabilization of the stake. The bottom helical coil ends with a sharp tip for easing the installation into the ground.

It is an object of this invention to provide a portable and reusable fishing pole holder which includes a helical coil at one end which can be screwed into the ground.

It is an object of this invention to provide a fishing pole holder which includes an integral crank handle for the purpose of screwing the stand into the ground.

It is an object of this invention to provide an integral crank handle for the purpose of screwing the stand into the ground wherein the crank handle services to support the fishing pole holder substantially vertically with respect to the ground.

It is another object of the present invention to provide an integral handle with sound dampening sleeve composed of a fabric, polymer, rubber, or elastomer to cover a selected portion thereof.

It is another object of the present invention to provide an integral handle fishing pole holder at an upper end of a shaft extending upwardly from the spiral auger wherein the elongated shaft can be bent at a selected angle to hold the fishing pole at a selected position with respect to the surface of the ground.

The present invention is for a rotary auger fishing pole holder comprising or consisting of an elongated vertical rod having a helical spiral coil extending downward therefrom a selected distance for penetration into the ground, and at least one "S" shaped loop extending from a top portion of the rod comprising at least two looped sections spaced apart from and in vertical alignment with one another.

More particularly, the rotary auger fishing pole has a medial portion comprising an elongated rod and a bottom portion comprising a helical spiral coil having a point extending downward from the elongated rod for a selected distance for penetration into the ground. The top portion defines a bow arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

A loop or ring is attached to the top distal end of the elongated rod and a second holding means such as a loop or cup is disposed below and spaced apart from and an in alignment with the ring to hold a handle and portion of the rod in an upright or selected angled position with respect to the ground.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
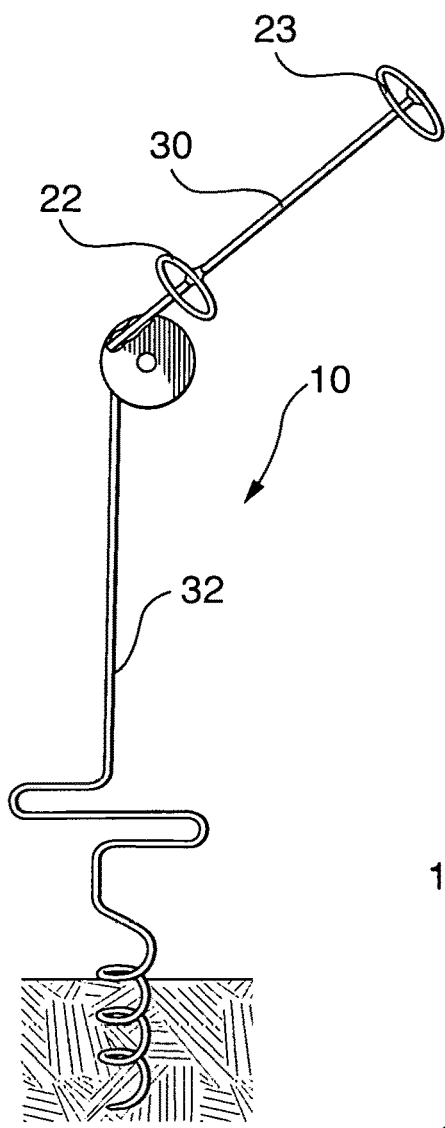
FIG. 1 is a perspective view of the rotary auger fishing pole holder utilizing a pair of spaced apart loops or rings for holding a handle of a rod and reel assembly therein in an upright position or an at a selected angle from the ground.
Figure 4:
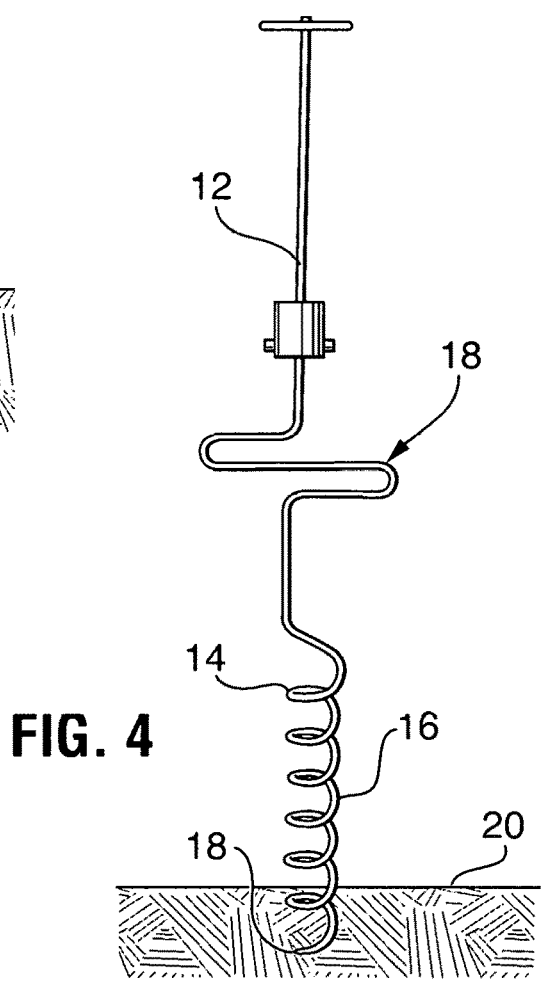
FIG. 4 is a side view of the rotary auger fishing pole holder of FIG. 3 showing a top loop and a cylindrical strip of material defining a sleeve or cup for supporting the distal end of a pole or rod handle positioned near the bottom portion of the top vertical segment above the "s-shaped" handle.

In accordance with the present invention, there is provided a rotary auger fishing pole holder stand 10 which holds a fishing pole holder in position above the ground for the intended user.

The rotary auger support stand includes a bottom section extending from a bottom distal end of the medial section, the bottom section comprising a helical spiral coil extending downward therefrom a selected distance including a tapered point for penetration into the ground. A medial section extends upward from the bottom section having a generally vertical rod. A handle section extending from the medial section comprising a curved rod forming at least one "S" shaped loop comprising a first horizontal segment extending outwardly from the medial section at a generally 90 degree angle a selected first length and having a proximate end portion curving upward forming a first 180 degree curved loop extending upward and over the first horizontal segment and past the medical section a selected second length defining a second horizontal section spaced apart from and in alignment with the first horizontal section, the second horizontal segment forming a second 180 degree curved loop extending upward and over a portion of the second horizontal segment forming a third horizontal segment extending to the medial section spaced apart and in alignment with the second horizontal segment, the third horizontal segment forming a generally 90 degree angle extending upward forming a top section comprising a rod in vertical alignment with the medial section for supporting an article thereon.

Auger

As shown in the figures, the helical auger is shown as a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

A preferred embodiment of the helical auger includes a top vertical portion for mounting an adapter or article to be supported thereon, a neck, a main body portion and a tip portion including a distal end forming a wedge or pointed segment.

The rotary auger support includes an above ground upright rod or shaft top portion having an offset neck connecting to a main body portion comprising a plurality of helixes. A distal end segment comprises a half helix ending in a sharp point.

The auger includes a main body portion helixes is comprised of bar stock having a cylindrical or square cross sectional area. The corners or the square bar stock form cutting edges when the stock is bent or formed into a helix. One preferred embodiment of the instant invention includes a main body portion having three full helixes and a tip portion comprising a half helix. The neck of the rotary auger support is angled inwardly toward the center of the main body portion in order to center the shaft top portion with respect to the main body portion. The neck portion includes a helix first segment, a short straight inward angled second segment, a straight angled third segment, and a short straight outward angled fourth segment, connecting to a vertical straight top segment of a desired length.

The rotary auger having a bottom portion for insertion into the ground comprises a helical coil having a cutting edge which functions as a plurality of flights forming an auger having cutting edges with a wedge point at the lower distal end to be fixedly and removably screwed into the ground to support the rotary auger support in an upright position.

The angle of the twists forming the flights of the helix of the main body portion are angled forming a helix. The cutting edges of the helix enable the auger to cut through soil and debris for ease of rotation and deep ground penetration which includes the desirable features of helix flights. Moreover, the auger of the present invention is an improvement over the flights of conventional augers in that the narrow diameter of the stock and diameter of the flights enables the auger to cut and drill through small openings in rocky soil and wedge between rocks. Moreover, the rotary auger support of the present invention can be rotatably inserted into hard clay which would resist penetration by an auger having flights.

More particularly, the rotary auger fishing pole holder includes a helical auger portion comprising a selected length of bar stock having a square cross sectional area including a bottom portion bent into a helix. The helix comprises a vertical straight top segment, a neck portion extending downward from the vertical straight top segment, a main body portion extending downwardly from the neck portion, the main body portion comprising a helical coil extending downward therefrom a selected distance and having a helical pitch of 2 for every 3.5 revolutions and a variable pitch of 3.0 for every 0.25 revolutions, a distal end segment comprising a half helical coil extending downward from the main body portion, and a distal end segment including a point for penetration into the ground. A handle extends upward from the vertical straight top segment. A vertical straight top portion extends upward from the handle, and means for mounting an object thereon extends from the top end of the vertical straight top portion such as one or more horizontal hooks or rings extending from the side for hold the fishing pole elongated rod body and/or a tubular member extending therefrom for holding the handle extending from the bottom distal end of a fishing pole.

The main body portion of the auger comprises a pitch diameter of 1.375 inches and a helical pitch of 2.0 inches. The helical coil of the helical auger portion includes the main body portion and the distal end segment comprises a cylindrical or square bar stock defining a cutting edge at each corner of the square bar stock. The handle comprising a curved portion having at least one "S" shaped loop extending upwardly from a top distal end of the medial section comprising a rod having at least two opposing looped sections spaced apart from and in alignment with one another, the at least two opposing looped sections including a first portion extending outwardly from the medial section at a right angle and a second portion extending upwardly over and spaced apart from and in alignment with the first portion forming a first curved loop extending past medial section a selected equal distance from the medial section and a third top portion extending upwardly over and spaced apart from and in alignment with the second portion forming a second curved portion extending a selected distance in alignment with the medial section. The mounting means extends from the vertical straight top portion. The mounting means may comprising a loop extending from a distal end of the vertical straight top portion and include a loop, hook, or tubular member extending from a bottom portion of the vertical straight top portion.

FIGS. 1-9 show the rotary auger fishing pole holder supporting the helical auger extending from the lower distal end of the vertical support rod or shaft, an integral handle having "s" shaped loops extending from a medial portion of the elongated shaft, and a pole holding means comprising a ring or loop attached to an upper distal end of the elongated rod or formed integrally therefrom and a proximate loop or cup attached to a portion or the elongated rod at a position below the top distal end and above the "S" shaped handle.

The integral handle fishing pole holder rest is located at an upper end of a shaft extending upwardly from a helical auger wherein the handle fishing pole holder rest can be bent at a selected angle to hold the fishing pole holder in a selected position with respect to the surface of the ground.

Figure 2:
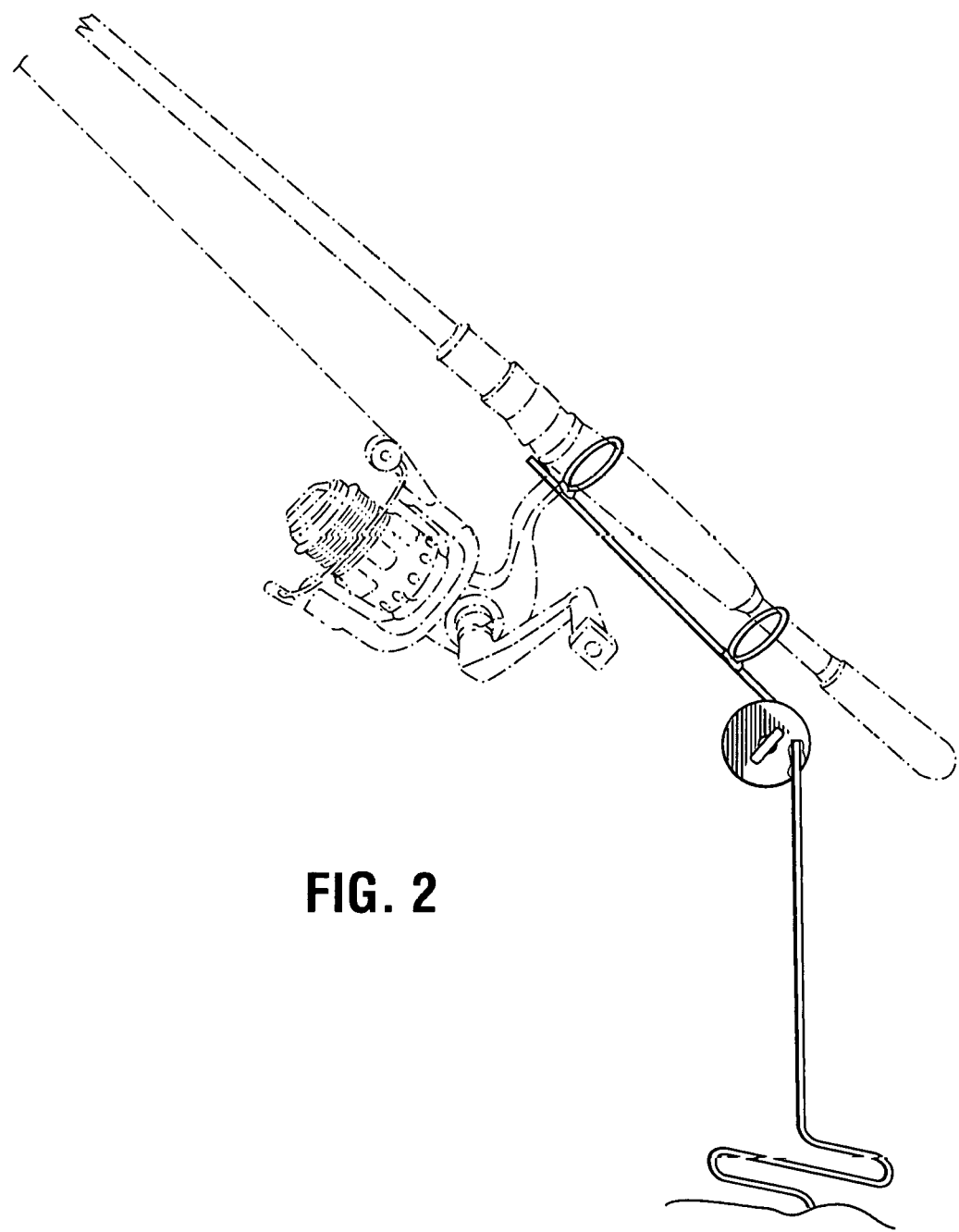
FIG. 2 is a perspective view of FIG. 1 showing a rod and reel fishing pole supported by the rotary auger fishing pole holder.
Figure 5:
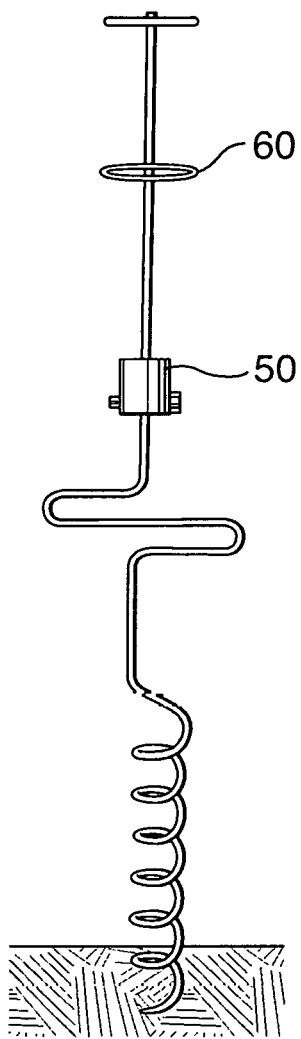
FIG. 5 is a side view of the rotary auger fishing pole holder of FIG. 3 showing a top loop and a cup for supporting the distal end of a pole or rod handle and a short neck segment extending from the rotary auger base.
Figure 6:
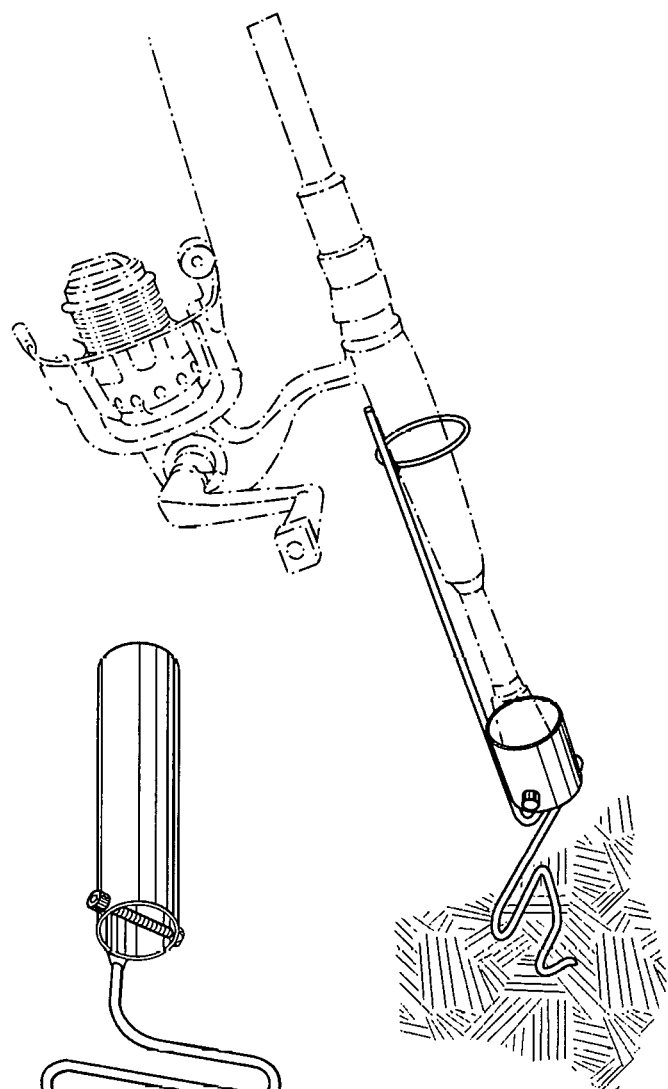
FIG. 6 is a perspective view of the rotary auger fishing pole holder having a top loop and a cup shown supporting the distal end of a pole or rod handle.

The rotary auger fishing pole holder mounting stand 10 provides a portable outdoor rest for removably holding a fishing pole holder upright on the ground. The stand includes an above ground elongated vertical rod or shaft 12 having a bottom auger portion for insertion into the ground comprising a helical coil 16 or plurality of spiral flights forming an auger 14 having a point 18 at the lower distal end to be fixedly and removably screwed into the ground 20 to support the stand 10 in an upright position. The S-shaped loop forming a handle 18 supports the fishing pole holder rest 22 configured, sized and shaped to accept a handle of a pole, or rod handle. As shown in FIGS. 1 and 2, the holder may comprise a pair of spaced apart aligned loops wherein the bottom loop defines a base or rest 22 for supporting a bottom distal end of a pole handle and top loop 32 defines a top loop for supporting the elongated pole or rod body. The loops 22 and 32 are affixed to and extend from a side of an elongated top section or portion 12 of the stand 10 above the S-shaped handle 18. The elongated vertical portion 12 may comprise single integral section or a pair of elongated members wherein the bottom segment 32 supports an arm 30 held in a pivotal relationship by a pair of aligned adjacent disc members held together in a biased or friction supported position. As shown in FIGS. 1-2, a disc member extends from the bottom of arm 30 and cooperatively and pivotally engages a disc member extending from the top distal end of elongated member 32. A fastener such as a screw, bolt, wingnut of the like holds the disc together. The arm 30 is disposed at a selected angle ranging from 0 to 180 degrees from a vertical position to support an arm 30 holding the fishing pole holder in a substantially vertical or angled position above the ground. The integral loop rest 22 which supports the is fishing pole holder serves as a handle for the purpose of rotating the auger into the ground.

Figure 7:
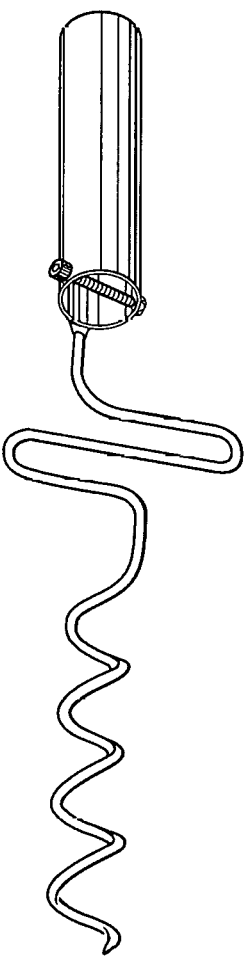
FIG. 7 is a perspective view of the rotary auger fishing pole holder having a top loop and a tubular member defining an elongated cup or sleeve for supporting the distal end of a pole or rod handle.
Figure 8:
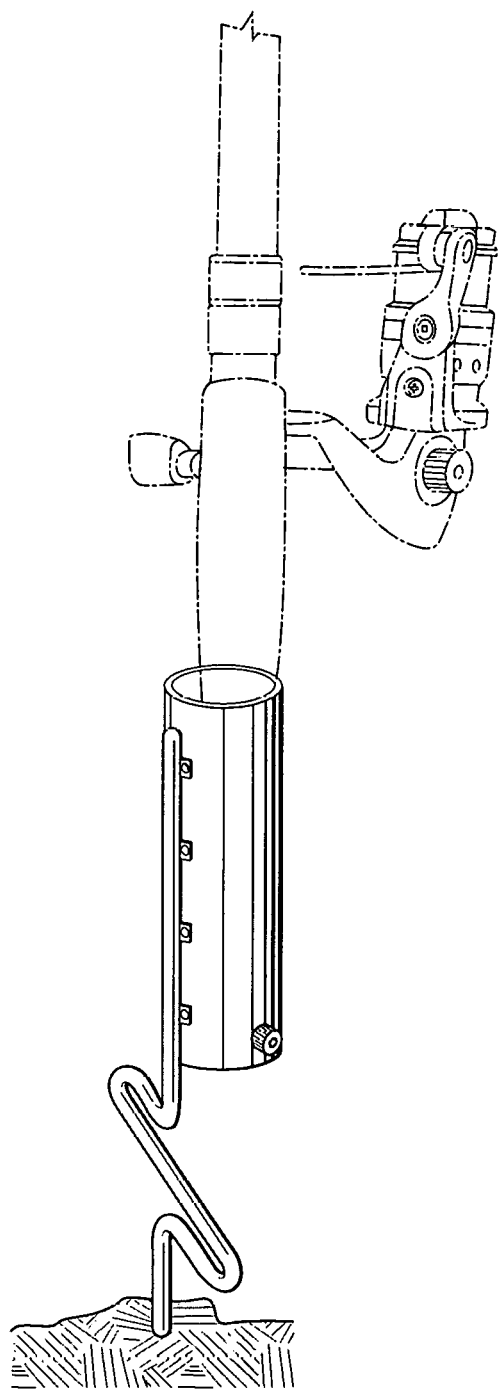
FIG. 8 is a perspective view of the rotary auger fishing pole holder of FIG. 7 shown holding a fishing pole.
Figure 9:
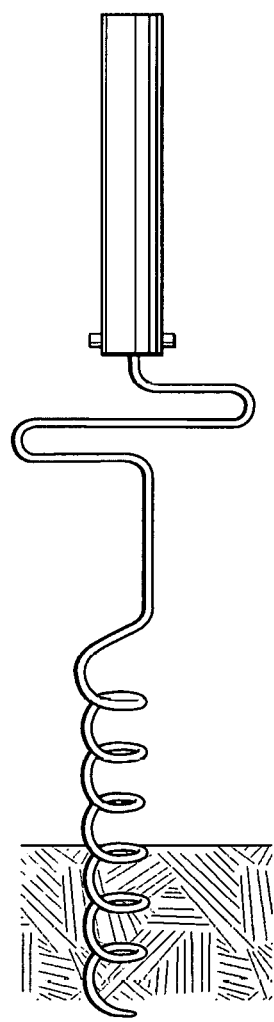
FIG. 9 is a side view of the rotary auger fishing pole holder of FIG. 6 having a top loop and a tubular member defining an elongated cup or sleeve for supporting the distal end of a pole or rod handle.

The integral crank handle rest 22 supports an arm of a fishing pole holder substantially vertically with respect to the ground. As shown in FIG. 7, a compound fishing pole holder is removably held in position whereby the weight of the fishing pole holder is supported by an S-shaped loop. The handle rest loop 22 includes a first portion 40 which extends outwardly from the rod 12 at a selected angle which is shown in the Figures to be a right angle or 90 degree angle. A second portion 42 extends upwardly over, spaced apart from and in alignment with the first portion forming a curved or bent portion 41 and extends past the shaft 12 a selected equal distance from the shaft 12. A third top portion 44 extends upwardly over, spaced apart from and in alignment with the second portion forming a curved or bent portion 43 and extends to the shaft 12. It is contemplated that one or more additional loops such as a second loop 50 could be added to the first loop 22 to provide means for holding an additional fishing pole holder. Moreover, the additional loop 50 could be spaced apart a selected wider or more narrower distance than the first loop 22 in order to provide variable means for holding an arm of a fishing pole holder at a selected angle with respect to the ground as shown best in FIG. 4.

Figure 3:
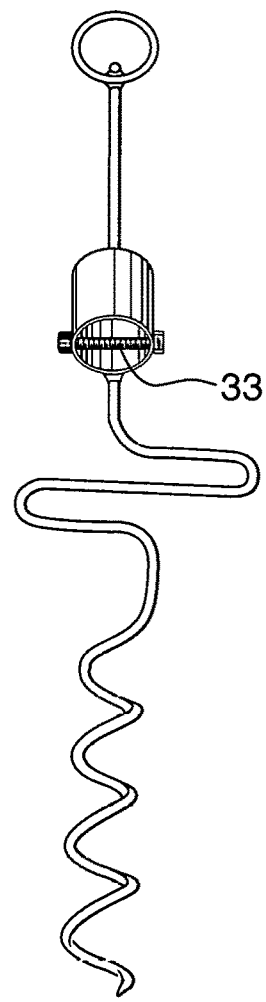
FIG. 3 is a perspective view of the rotary auger fishing pole holder having a top loop and a cup for supporting the distal end of a pole or rod handle.

A covering including a metal, a plastic, a fabric, a polymer, a rubber, an elastomer, and combinations thereof may be used to cover a selected portion of the fishing pole holder handle rest 22 or used to fabricate the rest 22. Moreover, the rest 22 may comprise a sleeve or cup 50 formed from a strip of solid material or wires, strips of material, and combinations thereof. The sleeve may be open at both ends; however, as shown in FIG. 3, a retaining means such as a strip of material 33 may be held in the bottom of the sleeve to support the distal end of the pole handle. As shown in FIG. 7, the sleeve or cup 50 may be elongated and affixed at an upper end to an upper end of the elongated vertical portion of the stand to support the elongated rod portion of the rod and reel or an elongated pole instead of using a top loop 23.

It is anticipated that the retainer may comprise a bottom ring 22 used without a stop means for supporting the distal end of the handle. The top ring or loop 23 or retaining means is preferably formed integrally with the elongated portion of the handle, but may be affixed thereto by welding or even a means of holding such as a clamp or screw extending through the elongated vertical member. It is anticipated that the top ring could be in the form of a detachable ring or loop which fastens to the elongated shaft or a ring or loop having a mounting means such as a cap which is mountable over the top distal end of the rod.

The retaining means comprising the loops or rings may also comprising partial loops or rings, or hook like members. The holding cup may include retaining means such as set screws of a clamp to secure the bottom portion of the rod handle therein. A flexible loop or tie 60 may be used in combination with the auger support stand to hold the pole within the holder.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A fishing pole holder, comprising:
a top fishing rod supporting section comprising an elongated rod including a fishing rod handle holding means;
a medial section extending from said top fishing rod supporting section, said medial section including a handle comprising a curved rod having at least one "S" shaped loop extending upwardly from a top distal end of said medial section comprising a rod having at least two opposing looped sections spaced apart from and in alignment with one another, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section; and
a bottom auger section extending from a bottom distal end of said medial section, said bottom section comprising a helical coil extending downward therefrom a selected distance including a tapered point for penetration into the ground.

2. The fishing pole holder of claim 1, including a retaining means in cooperative engagement with said holding means comprising a loop, a ring, a partial loop, a partial ring, a hook, a screw, a bolt, a flexible loop, a tie, a set screw, a strip of material and combinations thereof.

3. The fishing pole holder of claim 1, wherein said holding means comprises a cup, a sleeve, a sleeve including a stop means, a sleeve including a strip of material in the bottom, a ring, and combinations thereof extending a selected distance from said supporting section.

4. The fishing pole holder of claim 1, wherein said medial section, said supporting, and said bottom section are integrally formed from a single elongated rod.

5. A fishing pole holder, comprising:
a top supporting section comprising an elongated vertical rod including a fishing pole handle holding means;
a bottom auger portion comprising a helical coil having a point extending downward from said elongated vertical rod for a selected distance for penetration into the ground;
and a medial section defining a handle comprising at least one curved "S" shaped loop portion including a first straight section extending outwardly from said elongated rod at a selected angle from said top distal end of said elongated rod, a first curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section.

6. A rotary auger fishing pole holder comprising:
a) a helical auger portion comprising:
I) a selected length of bar stock having a square cross sectional area including a bottom portion bent into a helix comprising:
ii) a vertical straight top segment;
iii) a neck portion extending downward from said vertical straight top segment;
iv) a main body portion extending downwardly from said neck portion, said main body portion comprising a helical coil extending downward therefrom a selected distance and having a helical pitch of 2 for every 3.5 revolutions and a variable pitch of 3.0 for every 0.25 revolutions;
v) a distal end segment comprising a half helical coil extending downward from said main body portion; and
vi) said distal end segment including a point for penetration into the ground;
b) a handle extending upward from said vertical straight top segment;
c) a vertical straight top portion; and
d) means for holding a fishing rod handle thereon extending from a top distal end of said vertical straight top portion.

7. The rotary auger fishing pole holder of claim 6, wherein said main body portion comprises a pitch diameter of 1.375 inches and a helical pitch of 2.0 inches.

8. The rotary auger fishing of claim 6, wherein said helical coil of said helical auger portion including said main body portion and said distal end segment comprises a square bar stock defines a cutting edge at each corner of said square bar stock.

9. The rotary auger fishing pole holder of claim 6, said handle comprising a curved portion having at least one "S" shaped loop extending upwardly from a top distal end of said medial section comprising a rod having at least two opposing looped sections spaced apart from and in alignment with one another, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section.

10. The rotary auger fishing pole holder of claim 6, wherein said means for holding extending from a distal end of said vertical straight top portion comprises a cup, a sleeve, a loop, and combinations thereof.

11. The rotary auger fishing pole holder of claim 6, including a mounting means comprising a loop extending from a distal end of said vertical straight top portion.

12. The rotary auger fishing pole holder of claim 6, wherein said mounting means affixed to said vertical straight top portion comprises a tubular member including a support means disposed in a bottom of a tubular member.

13. The fishing pole holder of claim 1, wherein said holding section is affixed to said elongated vertical rod by attachment means comprising welding, a clamp, and a screw.

14. The fishing pole holder of claim 5, including a retaining means in cooperative engagement with said holding means comprising a loop, a ring, a partial loop, a partial ring, a hook, a screw, a bolt, a flexible loop, a tie, a set screw, a strip of material and combinations thereof.

15. The fishing pole holder of claim 5, wherein said holding means comprises a cup, a sleeve, a sleeve including a stop means, a sleeve including a strip of material in the bottom, a ring, and combinations thereof extending a selected distance from said supporting section.

16. The rotary auger fishing pole holder of claim 6, including a retaining means in cooperative engagement with said holding means comprising a loop, a ring, a partial loop, a partial ring, a hook, a screw, a bolt, a flexible loop, a tie, a set screw, a strip of material and combinations thereof.

17. The rotary auger fishing pole holder of claim 6, wherein said holding means comprises a cup, a sleeve, a sleeve including a stop means, a sleeve including a strip of material in the bottom, a ring, and combinations thereof extending a selected distance from said supporting section.

* * * * *